United States Patent [19]

Shiratori et al.

[11] Patent Number: 4,755,949
[45] Date of Patent: Jul. 5, 1988

[54] APPARATUS FOR SETTING WORK COORDINATE SYSTEM OF MACHINE

[75] Inventors: Hidefumi Shiratori; Osamu Mitsuizumi; Kazuhiko Oiwa, all of Abiko, Japan

[73] Assignee: Hitachi Seiki Co., Ltd., Tokyo, Japan

[21] Appl. No.: 853,914

[22] Filed: Apr. 21, 1986

[30] Foreign Application Priority Data

Apr. 19, 1985 [JP] Japan ................................ 60-084248

[51] Int. Cl.⁴ .............................................. G06F 15/46
[52] U.S. Cl. .................................. 364/474; 364/170; 318/572; 318/632
[58] Field of Search ............... 364/167, 170, 474, 475; 318/568, 572, 632

[56] References Cited

U.S. PATENT DOCUMENTS

| | | | |
|---|---|---|---|
| 3,605,531 | 9/1971 | Izumi et al. | 318/632 |
| 3,628,002 | 12/1971 | Meese et al. | 318/572 |
| 4,334,178 | 6/1982 | Lipp | 318/632 |
| 4,382,215 | 5/1983 | Barlow et al. | 318/632 |
| 4,451,892 | 5/1984 | McMurty | 364/474 |
| 4,561,050 | 12/1985 | Iguchi et al. | 364/167 |
| 4,583,159 | 4/1986 | Kanemoto et al. | 364/170 |
| 4,590,580 | 5/1986 | Takezawa et al. | 364/170 |
| 4,633,409 | 12/1986 | Sekikawa | 364/474 |

*Primary Examiner*—Jerry Smith
*Assistant Examiner*—John R. Lastova
*Attorney, Agent, or Firm*—Cushman, Darby & Cushman

[57] ABSTRACT

An apparatus for setting a work coordinate system of a machine tool is disclosed. A work coordinate system is set on the basis of a position from the surface to be machined of a work by automatic input of a tool mounting dimension. The apparatus is composed of a means for inputting/outputting machining data, an instrumentation means for measuring the positon of a blade tip of a tool, a tool reference point setting data memory for storing tool reference point setting data, an NC machining program data memory for storing an NC machining program for machining a work, a first processor for operating the tool reference point setting data and the machine coordinate value data to obtain the mounting dimesion data for each tool, and a second processor for obtaining work coordinate system data and the tool mounting dimension data.

1 Claim, 5 Drawing Sheets

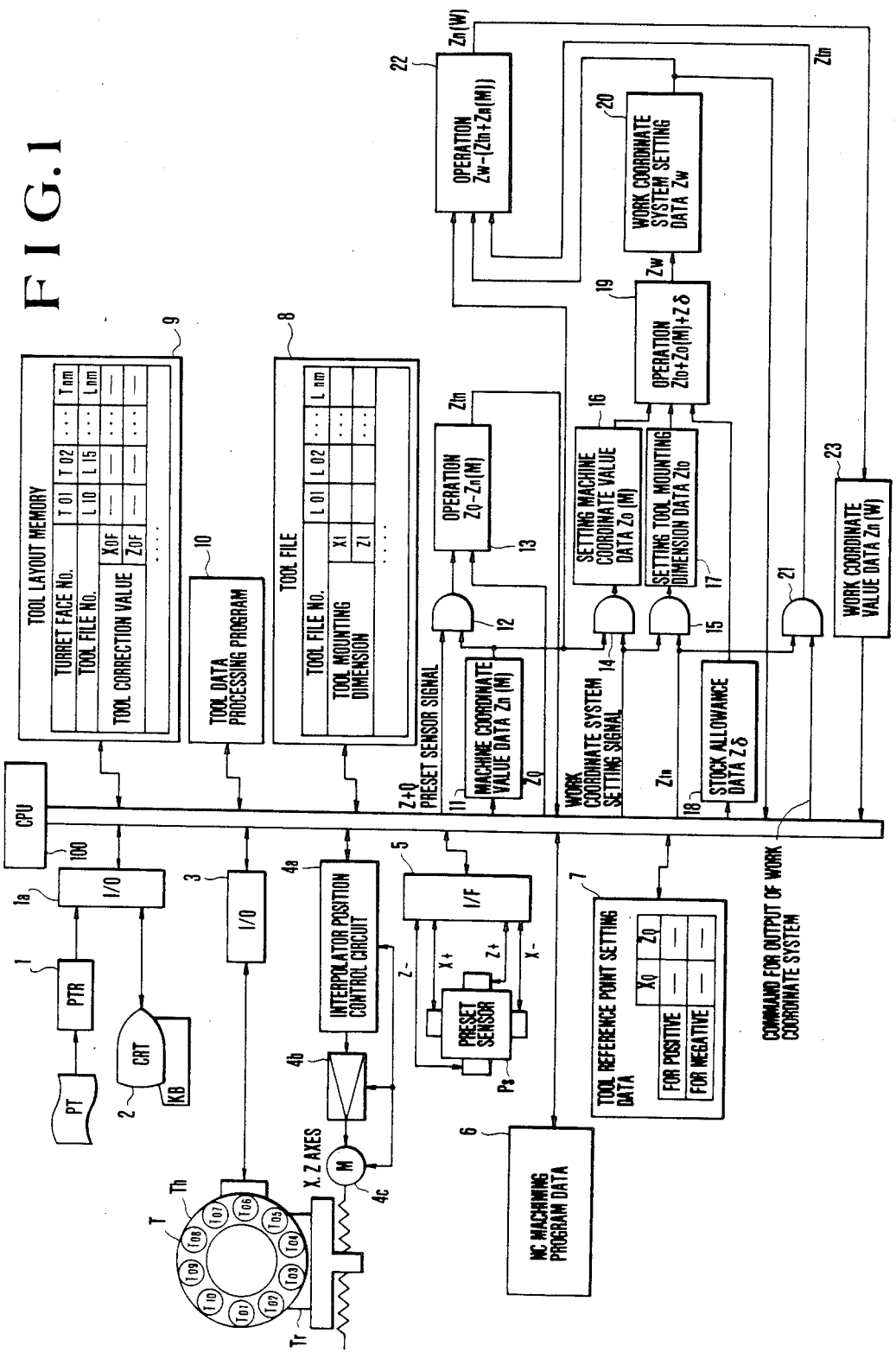

APPARATUS FOR SETTING WORK COORDINATE SYSTEM OF MACHINE

BACKGROUND OF THE INVENTION

The present invention relates to an apparatus for setting a work coordinate system on the basis of a position (program original point) from the surface to be machined of a work in which stock allowance is taken into consideration at the time of machining the work by a machine tool, particularly, by an NC machine tool.

A conventional NC machine tool has two coordinates for machine control and work machining, and before machining, the position of the machine coordinate system is first ascertained and thereafter the variation of a work mounting position (program original point) with respect to a machining program is manually corrected as the set value of the work coordinate system.

However, the above-described manual correction requires instrumentation, manual calculation, and complicated machine operation. This fact brings about such problems as misoperation, long-term planning time and production of defectives. Furthermore, the problem as to on what work point (program original point) the machining program is based, and the problem of the program original point itself varying with respect to the machine original point depending upon the stock allowances and distribution of them prior to machining remains unsolved in automatization.

In addition, since the value of tool correction and the tool mounting dimension are processed collectively by the tool offset memory of an NC apparatus, the actual position of the blade tip of the tool on the machine coordinate does not agree with the data on the NC apparatus, and when the tool mounting dimension is offset, the variation often becomes large. Especially, occurrence of interference at the time of turret index by means of a turret of a tool rest is a great problem from the point of view of safety. It is also disadvantageous that the operation of the conventional NC apparatus is easily mistaken by the operator and is difficult in terms of controlling the tools.

Recently, various developments have been in progress to automatically set the work coordinate system, but in the present state of the art, no satisfactory apparatus for setting a work coordinate system has been completed.

SUMMARY OF THE INVENTION

Accordingly, it is an object of the present invention to solve the above-described problems and to provide an apparatus for setting a work coordinate system of a machine tool which is easy to operate by automatically processing and setting a coordinate system in alignment with the original point of a working program with, for example, the turret surface of the tool rest used as a tool reference point.

To achieve this aim, an apparatus for setting a work coordinate system of a machine tool comprises a means for inputting/outputting NC machining data, an instrumentation means which is attached to the side of a headstock and is swung into the machine through an arm, a tool reference point setting data memory for storing the tool reference point setting data measured by bringing the turret surface into contact with the instrumentation means, an NC machining program data memory for storing the NC machining program data for machining a work, a first processor for obtaining the mounting dimension data of each tool by processing the tool reference point setting data from the tool reference point setting data memory and the machine coordinate value data, and a second processor for obtaining work coordinate system setting data from the setting machine coordinate value data in accordance with the number of the turret surface which is used for trial cutting, the setting tool mounting dimension data and the stock allowance data.

An apparatus according to the present invention having the above-described structure enables easy automatic operation by measuring the mounting dimension of each tool by means of the instrumentation means with, for example, the turret surface of the tool rest utilized as the tool reference point, and setting a work coordinate system in alignment with the original point of the machining program.

The above and other objects, features and advantages of the invention will be clear from the following description taken in conjunction with the accompanying drawings.

BRIEF DESCRIPTION OF THE DRAWINGS

FIG. 1 is a block diagram of the structure of an embodiment of an apparatus for setting a work coordinate system according to the present invention;

DESCRIPTION OF THE PREFERRED EMBODIMENT

An embodiment of the present invention will be described hereinunder with reference to the accompanying drawings.

(1) The fundamental principle of the present invention will first be explained.

FIGS. 2A to 2E, respectively, show the model structures which explain the setting of a work coordinate system in accordance with the present invention. Referring to FIGS. 2 A to 2 E, a chuck C is attached to the fore end portion of a main spindle S which is rotatably supported by a headstock H. A work W is held by claws D which are attached to the fore end portion of the chuck C. A preset sensor Ps is swingably mounted on the side wall of the headstock H through an arm L. The preset sensor is swung into the machine for instrumentation. Machine original point $\overline{O}_M$ lies on the side which faces the chuck C. A tool rest Tr is provided on the side which faces the chuck C such as to travel in a plane in the directions of X axis and Z axis.

A turret Th is attached to the front surface of the tool rest Tr such as to be able to be indexed. A tool T is mounted on the turret Th.

Figure 2A:
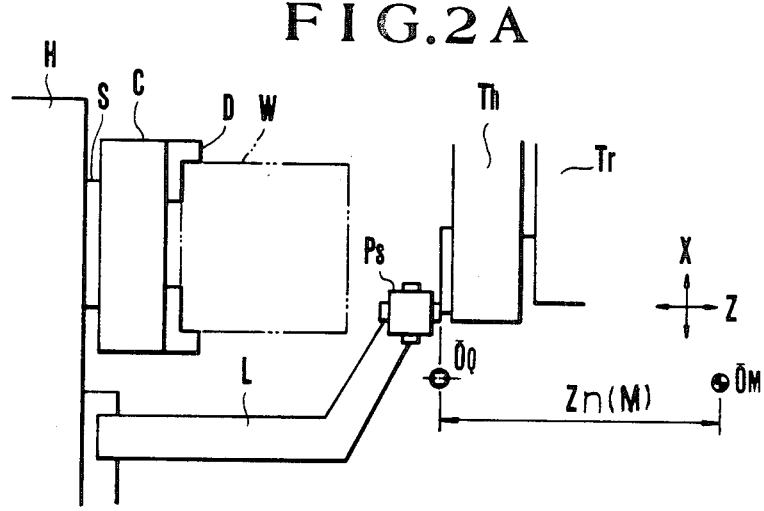
FIGS. 2A to 2E, respectively, show the model structure which explain the setting of a work coordinate system in accordance with the present invention.

FIG. 2A shows a state in which the preset sensor Ps is swung into the machine and is brought into contact with the reference surface of the turret Th which is attached to the front surface of the tool rest Tr. By bringing the preset sensor Ps into contact with the reference surface of the turret Th, the distance Zn(M) between the machine original point $\overline{O}_M$ and the surface of the turret Th is obtained. Zn(M) serves as setting data of the preset sensor Ps from the machine original Point $\overline{O}_M$. The exact relationship between the preset sensor Ps and the mounting position of the work W has been obtained in advance. This embodiment will be explained with respect to the direction of Z axis and explanation of the direction of X axis will be omitted because the same is applied thereto.

Figure 2B:
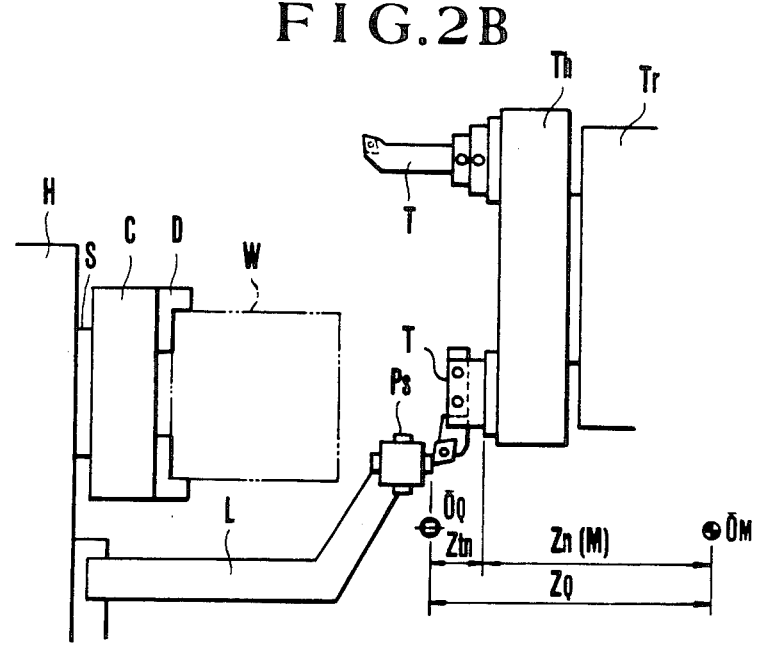

FIG. 2B shows a state in which the tool T is mounted on the surface of the turret Th and the preset sensor Ps is brought into contact with the blade tip. From a signal output when the preset sensor Ps is brought into contact with the blade tip, ($\overline{O}_Q$ is a reference point at the time when the signal is output. This reference point is used to obtain the distance Ztn from the reference surface of the turret Th in FIG. 2A to the blade tip in FIG. 2B.), the data as to the distance from the machine original point $\overline{O}_M$ to the reference surface of the tool T, namely a machine coordinate value Zn(M) is obtained.

If the distance from the surface of the turret Th to the blade tip of the tool T is a tool mounting dimension data Ztn, the following equation holds:

$$Z_Q = Ztn + Zn(M)$$

In FIG. 2A where there is no tool T, then, $Z_Q = Zn(M)$ and as is apparent from FIG. 2B, Ztn is obtained from the following equation:

$$Ztn = Z_Q - Zn(M)$$

This value Ztn is tool mounting dimension data.

This machine coordinate value Zn(M) can also be read in accordance with the movement of the tool rest Tr via NC unit.

Figure 2C:
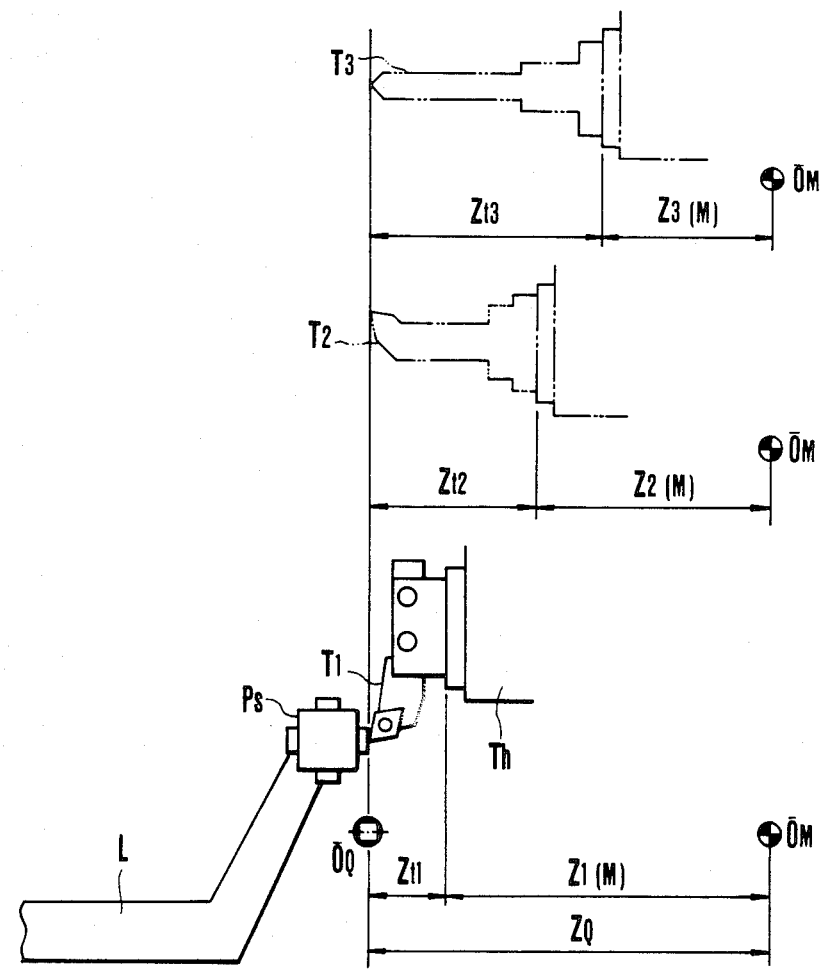

Referring to FIG. 2C, tools $T_1$, $T_2$ and $T_3$ are respectively attached to the surface of the turret Th, and the mounting dimension data of each tool is obtained in the way shown in FIGS. 2A and 2B.

As is obvious from FIG. 2C, the mounting dimensions Zt1, Zt2 and Zt3 of the tools $T_1$, $T_2$ and $T_3$, respectively are as follows:

$$Zt1 = Z_Q - Z1(M)$$

$$Zt2 = Z_Q - Z2(M)$$

$$Zt3 = Z_Q - Z3(M)$$

Figure 2D:
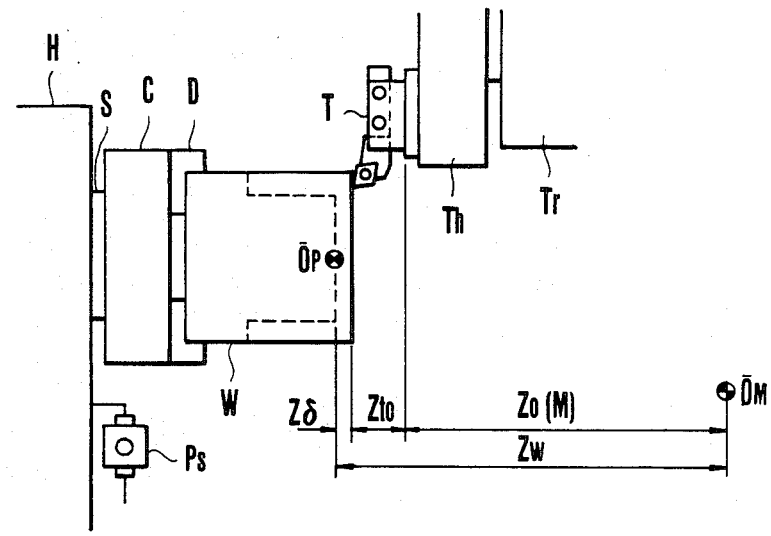

FIG. 2D shows a state in which the work W is held by the claws D, and the tool T for trial cutting is mounted on the turret Th with the blade tip of the tool T in contact with the work W on the surface to be machined.

In this state, the machine coordinate value data Zo(M) which is the distance between the machine original point $\overline{O}_M$ and the reference surface of the turret Th, and setting tool mounting dimension data Zto are obtained in the same manner as shown in FIGS. 2A and 2B. The machining program original point $\overline{O}_P$ is a position which is determined in consideration of the stock allowance Zδ from the machining surface, and the distance from the machine original point $\overline{O}_M$ to the machining program original point $\overline{O}_P$, namely, the work coordinate system setting value Zw is obtained from the following equation:

$$Zw = Zto + Zo(M) + Z\delta$$

The value Zw is thus obtained.

Figure 2E:
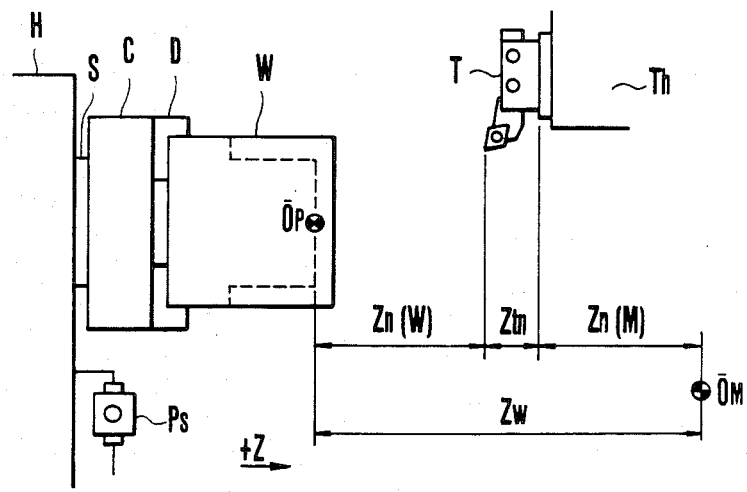

Then, the work coordinate system current value Zn(W) corresponding to the machining program original point $\overline{O}_P$ in each tool T is in the state as shown in FIG. 2E, and the value itself can be obtained from the following equation:

$$Zn(W) = ZW - (Ztn + Zn(M)).$$

(2) The structure of the present invention will next be explained concretely.

FIG. 1 is a control block diagram which shows an embodiment of an apparatus for setting a work coordinate system according to the present invention.

Referring to FIG. 1, NC data is input from a tape reader 1 for reading NC data through an input/output unit 1a by means of a CPU 100, and is temporarily stored in a machining program memory 6.

Various kinds of operation signals and information data of tools are fetched from a keyboard 2 with a display unit through the input/output unit 1a. A plurality of, e.g., ten tools are inserted into the turret Th on the tool rest Tr, and they are controlled as turret face Nos. $T_1$, $T_2$, ... $T_9$ and $T_{10}$.

The tool T inserted into the turret Th is indexed as occasion demands through an interface 3 in accordance with turret face indexing command data. The travel of the tool rest Tr is controlled by a motor 4c having X axis and Z axis through an interpolator, position controlling circuit 4a and an amplifier 4b. The present position of the X and Z axes which is fed back from the motor 4c is constantly delivered and fetched into a register 11 as the machine coordinate value Zn(M). The preset sensor Ps attached to the side wall of the headstock H through the arm L such as to be freely swingable can measure the positions in four directions, and outputs an instrumentation signal of necessary data through an interface 5. The preset sensor Ps is swung into the machine in advance to be brought into contact with the blade tip of each tool which is inserted into the curret Th, whereby the distances $Z_Q$ the distance from the machine original point $\overline{O}_m$ to a measuring reference (contact) of the preset sensor Ps and $X_Q$ from the machine original point $\overline{O}_M$ to the reference surface of the tool are measured, and the values $Z_Q$ and $X_Q$ are temporarily stored in a tool reference point setting data memory 7. Tool file data in which the main data in relation to the tools are classified by tool file numbers and registered together with the mounting dimension data of each tool Xt and Zt are temporarily stored in a tool file memory 8.

The layout of the tools necessary for the work to be machined is edited as tool layout data from the tool file by a data processing program 10 in correspondence with the relevant face number of the turret Th on the tool rest Tr, and is temporarily stored in a tool layout memory 9. The correction value of each tool which is measured is fetched into the fields of tool correction values $X_{OF}$ and $Z_{OF}$, respectively, of the tool layout memory 9. When the tool correction values $X_{OF}$ and $Z_{OF}$ are input, the tool mounting dimensions Xt and Zt are subjected to addition-subtraction processing and are stored in the tool file memory 8 as the latest exact tool mounting dimensions Xt and Zt.

An instrumentation signal is output when the preset sensor Ps is brought into contact with the reference surface of the turret Th into which each tool T is inserted, and the machine coordinate value data Zn(M) is fetched from the register 11 to a processor 13. A plus preset sensor signal in the direction of the Z axis commands an AND gate to be opened, through which the machine coordinate value data Zn(M) which is stored in the register 11 passes. The machine coordinate value data Zn(M) and the tool reference point setting data $Z_Q$ stored in the tool reference point setting data memory 7 are fetched into the processor 13, which operates the mounting dimension $Ztn = Z - Zn(M)$ and the result is temporarily stored in the tool file 8.

When the tool of the turret face No. n which is used for trial cutting is brought into contact with the surface of the work and a work coordinate system setting signal is supplied, the work coordinate system setting signal opens AND gates 14 and 15. The machine coordinate value data Zn(M) obtained at the time when the tool T of the turret face No. n which is used for trial cutting is brought into contact with the work W is fetched into the AND gate 14 from the register 11, while the mounting dimension data Ztn of the tool T of the turret face No. n for trial cutting which is registered in the tool file 8 is fetched into the AND gate 15. In this way, the machine coordinate value data Zn(M) are temporarily stored in a register 16 as the setting machine coordinate value data Zo(M). Ztn is temporarily stored in a register 17 as the setting tool mounting dimension data Zto. The stock allowance data Zδ is stored in a register 18 in advance. When the stock allowance data Zδ is not input, the register 18 takes the value of 0.

The setting machine coordinate value Zo(M), the setting tool mounting dimension data Zto and the stock allowance data Zδ are fetched from the registers 16, 17 and 18, respectively, into an processor 19. The processor 19 operates, $$Zw = Zto + Zo(M) + Z\delta.$$

and the result is temporarily stored in a register 20 as the work coordinate system setting data Zw.

Under the work coordinate system output command (e.g., a command given when displaying the present position on the CRT), an AND gate 21 is opened to fetch the value of the tool mounting dimension Ztn which is operated by the processor 13 and the tool mounting dimension Ztn which has passed through the AND gate 21 is fetched into a processor 22. Into the processor 22, the machine coordinate value data Zn(M) and the work coordinate system setting data Zw are also fetched from the registers 11 and 20, respectively. The processor 22 operates $$Zn(W) = Zw - (Ztn + Zn(M))$$

and the result is fetched into a register 23 as the work coordinate value data Zn(W), and is output as the present value of the work coordinate system. The work coordinate value data Zn(W) which is stored in the register 23 serves as the coordinate value from the machining program original point $\overline{O}_P$ for each tool T. and the tool blade tip position data at the time of machining.

(3) The operation of the apparutus according to the present invention will be explained with reference to the flowchart of FIG. 3.

Figure 3:
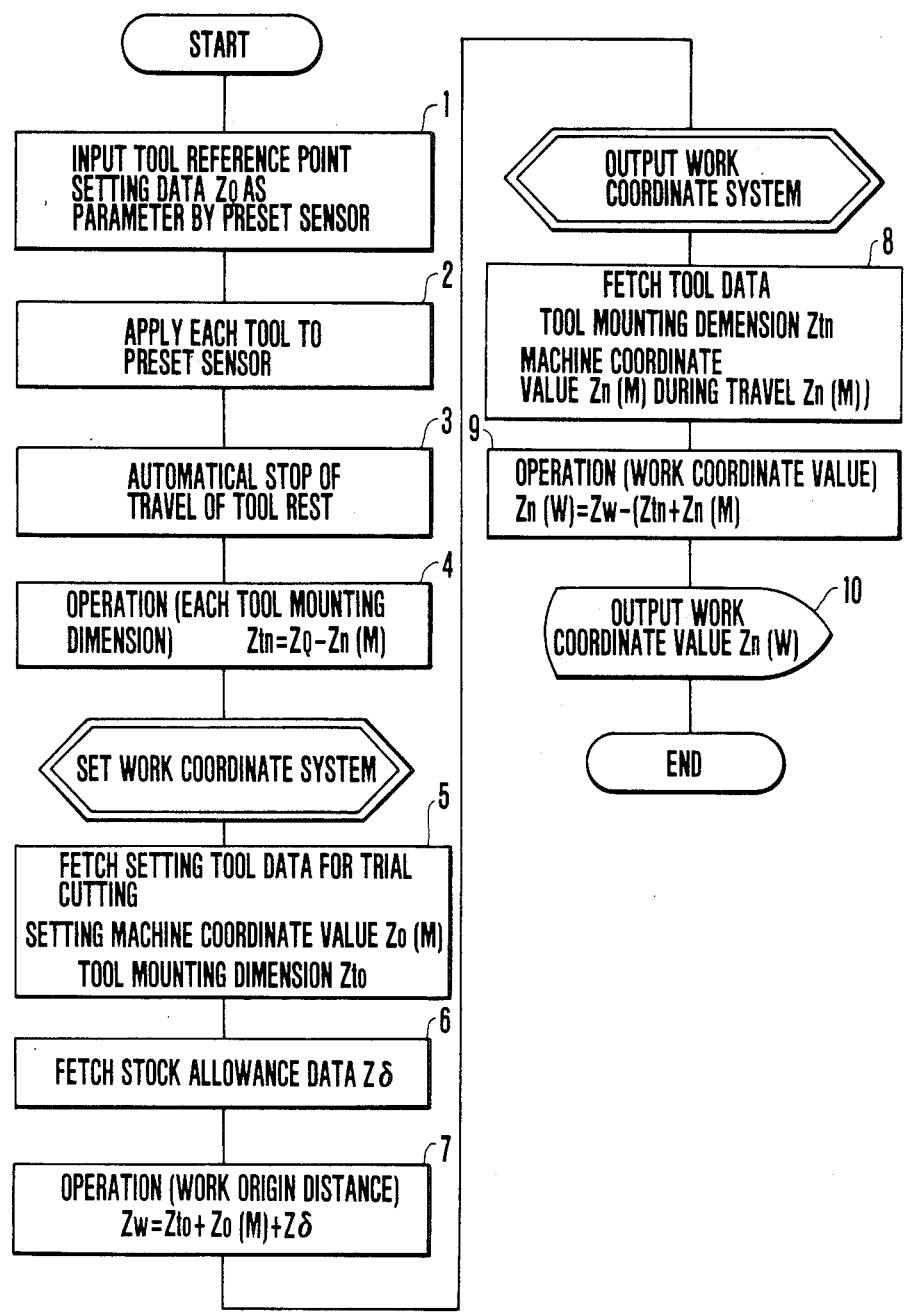
FIG. 3 is a flowchart which shows the operation of the apparatus according to the present invention.

Referring to FIG. 3, in the step 1, the tool reference point setting data $Z_Q$ is input as a parameter in advance by the preset sensor Ps, and is stored in the tool reference point setting data memory 7. In the step 2, each tool T is brought into contact with the preset sensor Ps (FIG. 2B), and the travel of the tool rest is automatically stopped (step 3). The machine coordinate value Zn(M) is fetched in accordance with a signal from the preset sensor Ps in the step 4, and $Ztn = Z_Q - Zn(M)$ is operated by the processor 13 to obtain and store the mounting dimension Ztn of each tool T in the tool file 8 (step 4).

Setting of the work coordinate system is started. In the step 5 the setting tool data of the tool which is used for trial cutting is fetched. In other words, the setting machine coordinate value Zo(M) and the setting tool mounting dimension Zto are fetched into the processor 19. In the step 6, the stock allowance data Zδ is fetched into the processor 19. In the step 7, $Zw = Zto + Zo(M) + Z\delta$ is operated by the processor 19. The value Zw obtained is the distance between the machine original point $\overline{O}_M$ and the machining program original point $\overline{O}_P$, namely, the point $\overline{O}_P$ which is distant from the machine original point $\overline{O}_M$ by Zw is regarded as the machining program original point.

The output of the work coordinate system is conducted in the following procedures.

In the step 8, the data of the tool to be used for machining is fetched. That is, the tool mounting dimension Ztn of the tool to be used for machining is fetched from the tool file 8 and the machine coordinate value Zn(M) which is in course of travelling from the register 11 is also fetched into the processor 22. Further, the work coordinate system setting data Zw which is obtained by the processor 19 and stored in the register 20 is also fetched into the processor 22.

In the step 9, the processor 22 operates $$Zn(W) = Zw - (Ztn + Zn(M))$$

and in the step 10, the work coordinate value Zn(W) obtained in the step 9 is output, which is displayed as the position of the blade tip of the tool from the machining program original point $\overline{O}_P$ in the work coordinate system.

As described above, according to the present invention, the work coordinate system is set by automatically setting the mounting dimension in relation to the reference point of each tool by the preset sensor. Accordingly, it is possible to correct the tool mounting dimension which has been registered in the tool file and reload it immediately after the tool correction value such as the wear of the tool is input in the tool layout memory.

The tool mounting dimension data is fed back to the NC machining data and thereby exact machining is conducted. Thus, the present invention is very effective for controlling the tool mounting dimension.

Furthermore, since the actual position of the machine coordinate which indicates the position of the blade tip of a tool constantly and continuously agrees with the present value data thereof on the NC control apparatus side, there is no problem of interference such as that experienced in the prior art. Thus, this apparatus is safe and easy to control, and therefore even a nonexpert can operate it without misoperation.

The present invention which sets the coordinate system of a work by automatical input of a tool mounting dimension facilitates accommodation to automatization and an FMS.

In addition, the apparatus according to the present invention is effective especially for reduction of labor and manpower at the time of automatic setting of procedures which are required when the tools are replaced. Thus, the present invention makes much contribution to the improvement of production efficiency with the precision maintained in automatization.

While there has been described what is at present considered to be the preferred embodiment of the invention, it will be understood that various modifications may be made therein, and it is intended to cover in the appended claim all such modifications as fall within the true spirit and scope of the invention.

What is claimed is:

1. An apparatus for determining a work coordinate system of a machine tool and for compensating for differences between the determined work coordinate system and data in a numerical control machining program data memory, comprising:

means for inputting/outputting machining data;

numerical control machining program data memory means for storing numerical control machining programs used in machining a work;

a tool rest having a surface defining a reference plane;

a tool mounted to said reference plane of said tool rest and having a blade tip;

instrumentation means for measuring the position of said blade tip which is positioned at a tool reference point position;

tool reference plane data memory means for storing a distance from a machine original point to said reference plane of said tool rest, said distance being determined when said reference plane is abutted against said instrumentation means;

first arithmetic means for obtaining as mounting dimension data for said tool a difference between said tool reference point position and the distance from said machine original point to said reference plane of said tool rest, second arithmetic means for obtaining as a work coordinate value data a difference between a distance from the machine original point to the blade tip of the tool and a distance from a program original point to the machine original point, said program original point being determined by a position from a work machining plane including a machining allowance.

* * * * *